Patented Feb. 14, 1933                                                      1,897,904

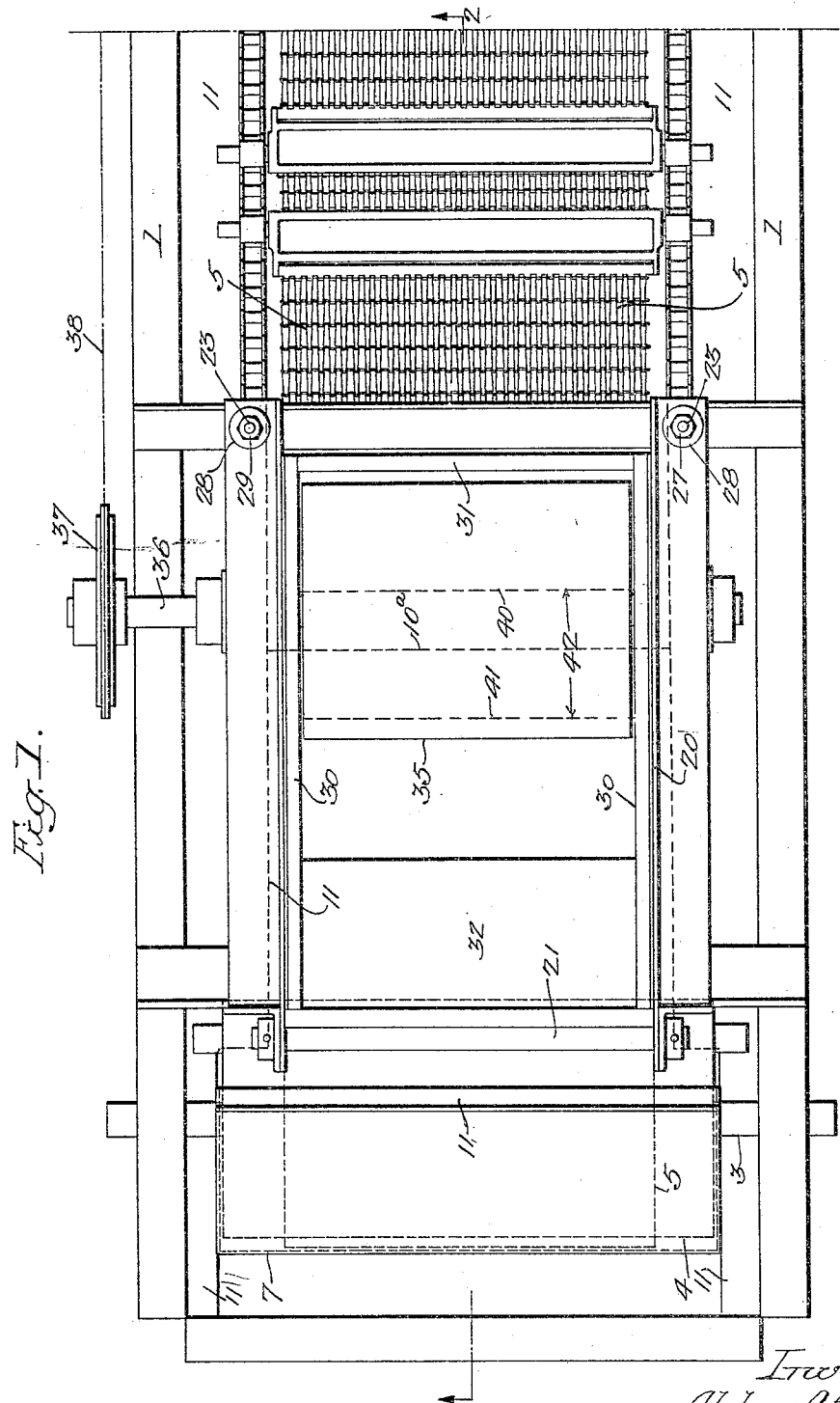

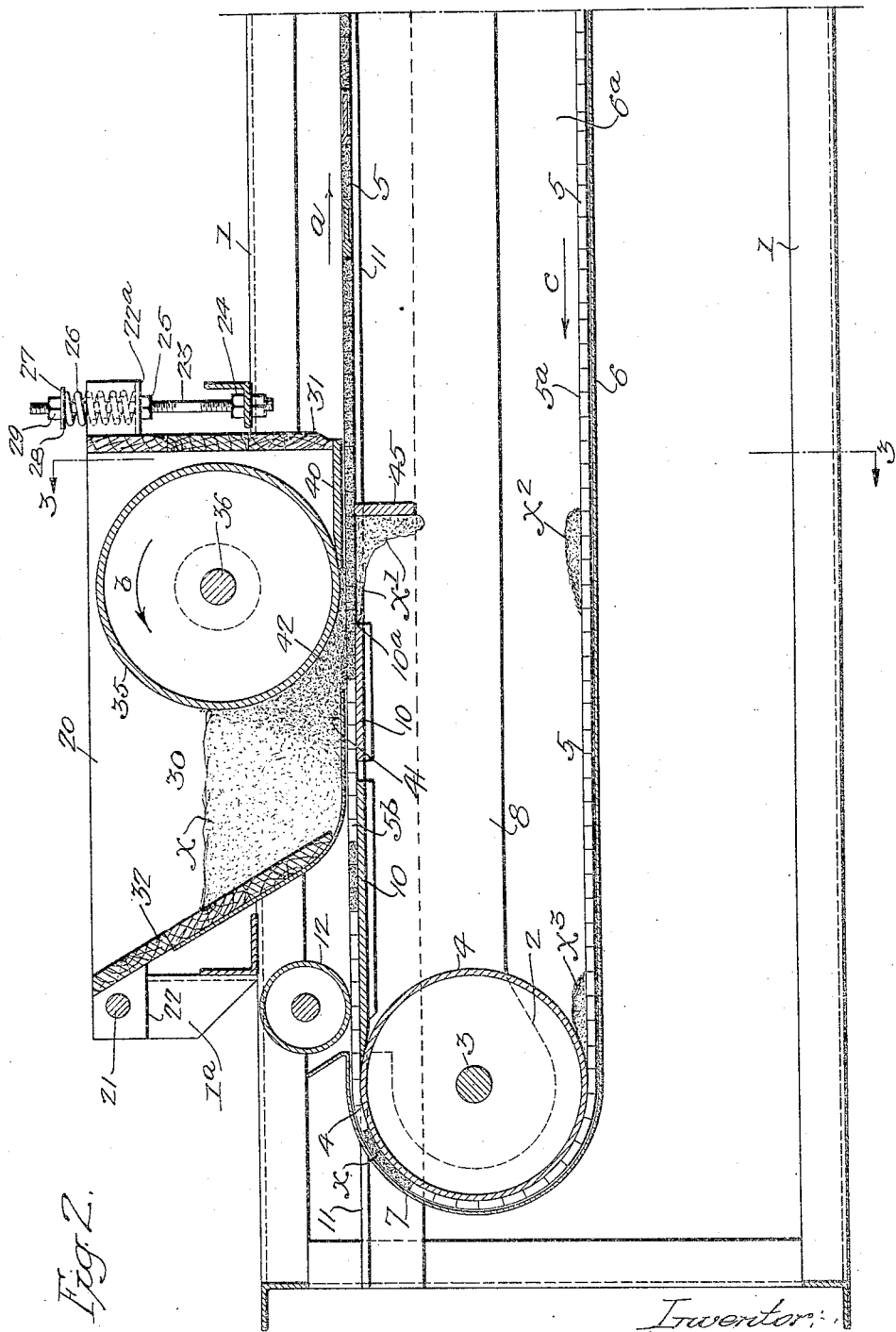

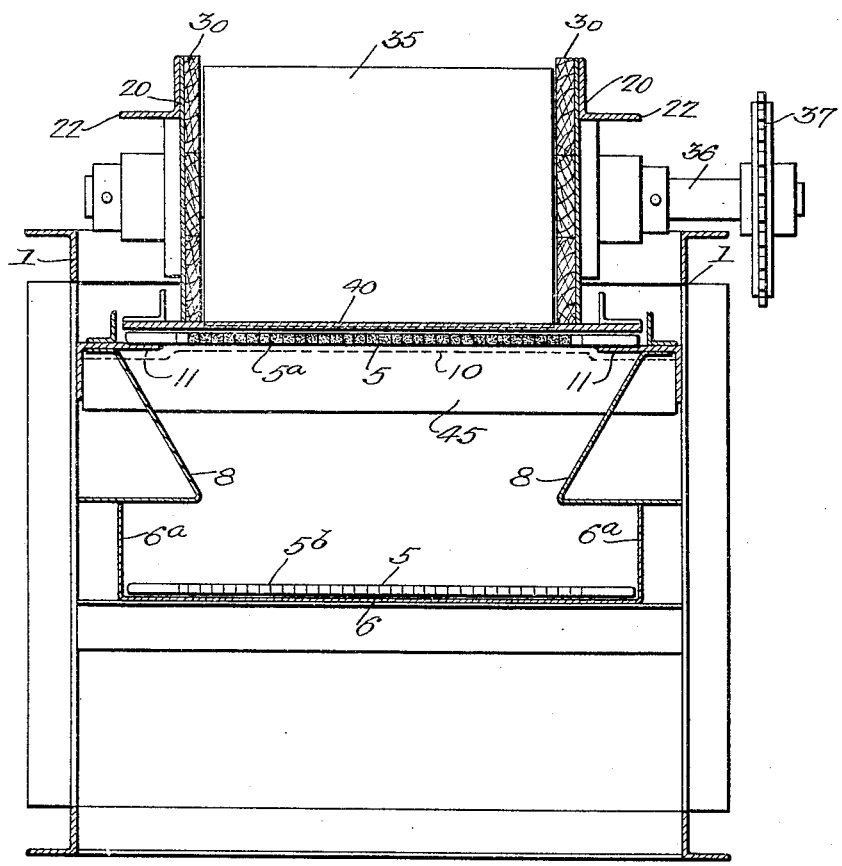

UNITED STATES PATENT OFFICE

ALPHEUS O. HURXTHAL, OF PHILADELPHIA, PENNSYLVANIA, ASSIGNOR TO PROCTOR & SCHWARTZ, INCORPORATED, OF PHILADELPHIA, PENNSYLVANIA, A CORPORATION OF PENNSYLVANIA

PASTING MECHANISM FOR CHEMICAL DRIERS

Application filed March 25, 1930. Serial No. 438,827.

This invention relates to a pasting mechanism adapted for use in an apparatus, for drying or otherwise treating plastic materials, which is similar to the apparatus shown and described in my co-pending application, Serial No. 370,662, filed June 13, 1929.

In the commercial development of the apparatus shown in my co-pending application I have discovered that in pasting plastic materials into the openings of a foraminous conveyer apron, either by rolls, scrapers, or otherwise, considerable power is required to pull the apron through such a pasting equipment, which places the apron under great tensional strain.

The object of the present invention is to provide a pasting mechanism which will require less power and which will reduce the tensional strain on the conveyer accordingly.

In the apparatus shown in my said co-pending application I employed a pair of rolls, one disposed above the apron and one below the apron, the peripheries of the rolls being disposed a distance apart which is substantially equal to the thickness of the apron, both rolls being driven in unison to assist in pulling the apron through the pasting mechanism. By this mechanism the material preceding the rolls is pasted down into the meshes of the apron and is compressed therein at a point in front of the ingress side of the rolls which builds up an enormous pressure and a consequent enormous resistance to the travel of the apron passing between the rolls and through the pasting mechanism.

Such a condition obviously is a natural one because of the compressive strength of plastic materials in general. Plastic materials as a rule, however, are very weak in shearing strength and I have discovered that by providing but one roll above a suitable opening in the floor of the pasting mechanism over which the apron passes, such a roll will freely force the material into and through the openings in the apron completely filling the said openings and extending the material to some extent beyond the lower side of the apron, the extruded excess material, hanging below the apron, being sheared off flush or substantially flush with the underside of the apron by a suitable shear blade, as the said apron is moved forward through the apparatus, which greatly reduced the force required to pull the apron through the pasting mechanism and at the same time proportionately reducing the tensional strain on the said conveyer apron.

Referring to the drawings:

Fig. 1 is a plan view of a pasting mechanism made in accordance with the principles of my invention;

Fig. 2 is a vertical sectional elevation taken on the line 2—2, Fig. 1, and

Fig. 3 is a transverse sectional elevation taken on the line 3—3, Fig. 2.

The pasting mechanism shown in the attached drawings is adapted to replace that shown in my co-pending application above noted. A suitable framework is illustrated at 1. Bearings 2, 2 are provided on the framework 1 for a transversely extending shaft 3, on which is mounted a roller or cylinder 4. Passing around the cylinder 4 is a foraminous conveyer 5, which is of the same general character as that illustrated in my co-pending application, Serial No. 305,589, filed September 12, 1928, and in the co-pending application of Philip W. Bur, Serial No. 370,911, filed June 14, 1929.

The lower run $5^a$ of the conveyer apron 5 is supported by a trough-like platform 6 which is disposed intermediate the side frame members 1, 1 and curves upwardly, at one of its ends, around the roller 4, as illustrated at 7, the side edges of the platform 6, 6 having upturned flanges $6^a$, $6^a$ as shown in Fig. 3.

Disposed above the trough-like platform 6 are angularly disposed side plates 8, 8 which extend downwardly from a pair of longitudinally extending angle frame members 11, 11 which provide a support for a platform 10 over which and the said horizontally disposed webs of the angle members 11, 11, the upper run $5^b$ of the conveyer apron 5 passes.

The platform 10 extends between and flush with the upper sides of the horizontally disposed webs of the angle members 11, 11 and substantially tangent to the upper side of the roller 4, and the horizontally disposed webs or legs of the angle members 11, 11 provide guides for the upper run 5$^b$ of the conveyer apron 5, beyond the platform 10.

Rotatably mounted in the side frames 1, 1 and above the platform 10 is a roller 12 which bears against the upper run 5$^b$ of the conveyer 5 and presses the same downwardly onto the platform 10.

Disposed above the platform 10 and the upper run 5$^b$ of the conveyer is a hopper 20 which is pivotally mounted at 21 on suitable brackets 1$^a$ secured to the framework 1, at a point substantially above the roller 12. The opposite sides of the hopper 20 are provided with angle members 22, 22 which project beyond both ends of the hopper, providing at one end of the hopper bearings for the pivot rod 21 thereof and at the opposite end of the hopper suitable lugs or projections 22$^a$, 22$^a$, through which pass supporting rods 23, 23.

The said rods 23, 23 are anchored at their lower ends in the framework 1 by means of nuts 24, 24. The lower sides of the lugs or projections 22$^a$, 22$^a$ are adapted to engage and rest on stop nuts 25, 25 which are threaded onto the rods 23, 23. The said rods pass through the projections 22$^a$, 22$^a$ and through coiled springs 26, 26 which encircle the said rods, between the projections 22$^a$, 22$^a$ of the hopper and adjustable abutments 27, 27 on the rods 23, 23.

The adjustable abutments 27, 27 in the present instance consists of washers 28 and nut 29, whereby the hopper is yieldably held against the abutments 25, which regulates the position of the bottom of the hopper with respect to the upper surface of the upper run 5$^b$ of the conveyer belt 5, passing below the hopper.

The hopper 20 comprises side members 30, 30, secured to the angle bars 22, 22 respectively, a substantially vertical end member 31 at the free end of the hopper and an inclined end member 32 adjacent the pivoted end 21 of the hopper.

Rotatably mounted in the hopper between the side members 30, 30 thereof is a pasting roll 35 which is secured to a shaft 36 rotatably mounted in suitable bearings 36$^a$, 36$^a$ carried by the side members 30, 30 of the hopper structure. The shaft 36 extends outside the said hopper structure and is there provided with a sprocket 37 around which passes a drive chain 38. The chain 38 is adapted to be connected to any suitable source of power by which the pasting roll 36 is adapted to be rotated.

Between the lower side of the pasting roll 35 and the end 31 of the hopper the said hopper is provided with a bottom member 40, and extending inwardly from the inclined end 32 of the hopper the said hopper is provided with a bottom member 41 which stops at a point removed from the pasting roll 35, to provide an opening 42 in the bottom of the hopper through which the plastic material $x$ contained within the hopper may be forced by the pasting roll 35 into the foraminous conveyer 5, which is moving over the platform or backing plate 10 and between the said backing plate 10 and the bottom 40—41 of the hopper 20.

Obviously, as the upper run 5$^b$ of the conveyer 5 moves in the direction of the arrow $a$ shown in Fig. 2, and as the pasting roll 35 rotates in the direction of the arrow $b$ shown thereon in said figure, the material $x$ will be forced through the opening 42 in the bottom of the hopper 20 and into the openings of the conveyer 5, the material passing through the said conveyer and hanging from the lower side thereof in the manner illustrated at $x^1$ in Fig. 2.

As the upper run 5$^b$ of the conveyer advances in the direction of the arrow $a$ shown in Fig. 2, the surplus material $x^1$ is sheared from and flush with the lower side of the upper run 5$^b$ of the conveyer apron 5 by a shear blade 45 which extends transversely across the apparatus intermediate the side plates 8, 8, the said surplus material dropping into the hopper-like structure formed by the side plates 8, 8 and the flanges 6$^a$, 6$^a$ of the platform 6 onto the lower run 5$^a$ of the conveyer, as illustrated at $x^2$ in Fig. 2.

As the said lower run 5$^a$ of the conveyer advances in the direction of the arrow $a$ shown adjacent thereto in Fig. 2, the said surplus material is carried by the lower run 5$^a$ of the conveyer apron 5 to and under the roll 4, in the manner illustrated at $x^3$, and as the roll 4 rotates the said surplus material is compressed, within the openings of the conveyer 5, between the periphery of the roll 4 and the curved guard 7, in the manner illustrated at $x^4$, whereupon the surplus material is again carried back by the upper run of the conveyer to and through the pasting mechanism of the apparatus.

The rear edge 10$^a$ of the platform or backing board 10, as illustrated in Fig. 2, is disposed in such relation with respect to the periphery of the pasting roll 35 that it forms with the periphery of the pasting roll a throat having converging faces into which the plastic material $x$ passes and is drawn by the concurrent movements of the apron and the peripheral face of the roll 35, whereby the material is compressed to the desired degree and insuring that all the openings in the conveyer apron are filled to the desired extent with the plastic material to be treated.

The terminus 10$^a$ of the backing plate 10, as shown in Fig. 2, is disposed at a point in advance of the vertical plane extending through the center of rotation of the pasting roll 35, at which point the greatest compression of the material would take place, but by placing the terminal edge 10$^a$ of the backing plate 10 in advance of the maximum compression point sufficient compression of the material is obtained to thoroughly compact the material in all of the openings of the conveyer and at the same time relieve the conveyer of the great strain produced by the great force which would be required to pull the conveyer through the apparatus, should the backing platform extend completely under the pasting roll 35 to and beyond the point of maximum compression of the material being pressed into the conveyer.

Therefore, in place of the material being placed under the maximum compression, the surplus material is extended from the under side of the upper run of the conveyer apron and is sheared therefrom as the said upper run of the conveyer advances across the transversely extending shear blade 45.

Should undue compression of the material occur between the periphery of the pasting roll 35 and the rear edge 10ᵃ of the backing board 10, the springs 26, 26 will yield and the extra body of material will pass the said terminal edge 10ᵃ into the space between said edge and the front edge of the shear blade 45, which will then shear such extruded material from the under side of the conveyer apron.

I claim:

1. A device, for pasting plastic materials in a foraminous conveyer, comprising a hopper disposed adjacent one face of the conveyer for holding the material in position to be pressed into and through openings in the conveyer, and means for shearing extruded material from the opposite face of the conveyer upon relative movement being effected between the conveyer and the said shearing means.

2. A device, for pasting plastic materials in a foraminous conveyer, comprising a hopper disposed adjacent one face of the conveyer for holding the material, extruding means for forcing the material out of the hopper into and through the openings in the foraminous conveyer, and means for shearing extruded material from the opposite face of the conveyer upon relative movement being effected between the conveyer and the said shearing means.

3. A device, for pasting plastic materials in a foraminous conveyer, comprising a hopper disposed adjacent one face of the conveyer for holding the material and having an opening through which the material is adapted to pass, extruding means adjacent said opening for forcing the material out of the hopper into and through the openings in the foraminous conveyer, and means for shearing extruded material from the opposite face of the conveyer upon relative movement being effected between the conveyer and the said shearing means.

4. A device, for pasting plastic materials in a foraminous conveyer, comprising a hopper disposed adjacent one face of the conveyer for holding the material and having an opening through which the material is adapted to pass, extruding means adjacent said opening for forcing the material out of the hopper into and through the openings in the foraminous conveyer, a backing board adjacent the opposite face of the conveyer against which the material is pressed by the extruding means, and means for shearing extruded material from the opposite face of the conveyer upon relative movement being effected between the conveyer and the said shearing means.

5. A device, for pasting plastic materials in a foraminous conveyer, comprising a hopper disposed adjacent one face of the conveyer for holding the material and having an opening through which the material is adapted to pass, extruding means adjacent said opening for forcing the material out of the hopper into and through the openings in the foraminous conveyer, a backing board adjacent the opposite face of the conveyer against which the material is pressed by the extruding means, said board having a terminal edge at one side of the extruding means to permit the material to be forced through the openings in the conveyer by the extruding means, and means spaced from the said terminal edge of the backing board and at the opposite side of the extruding means for shearing extruded material from the opposite face of the conveyer upon relative movement being effected between the conveyer and the said shearing means.

6. A device, for pasting plastic materials in a foraminous conveyer, comprising a hopper disposed adjacent one face of the conveyer for holding the material in position to be pressed into and through openings in the conveyer, means for shearing extruded material from the opposite face of the conveyer upon relative movement being effected between the conveyer and the said shearing means, and means for returning the sheared-off material to the hopper.

7. A device, for pasting plastic material in a foraminous conveyer having a carrying run and a return run disposed in substantially horizontal planes one above the other, said device comprising a hopper disposed above the carrying run, a backing platform disposed below the carrying run and on which the said run rests, an extruding roll rotatably mounted in the hopper at a point adjacent the rear edge of the backing platform for forcing the material out of the hopper into the conveyer and compressing the material in the conveyer, and a shear blade spaced rearwardly from the rear edge of the backing platform and engaging the lower surface of the carrying run of the conveyer for shearing extruded material from the said under side of the carrying run of the conveyer.

8. A device, for pasting plastic material in a foraminous conveyer having a carrying run and a return run disposed in substantially horizontal planes one above the other, said device comprising a hopper disposed above the carrying run, a backing platform disposed below the carrying run and on which the said run rests, an extruding roll rotatably mounted in the hopper at a point adjacent the rear edge of the backing platform for forcing the material out of the hopper into the conveyer and compressing the material in the conveyer, a shear blade spaced rearwardly from the rear edge of the backing platform and engaging the lower surface of the carrying run of the conveyer for shearing extruded material from the said under side of the carrying run of the conveyer, said sheared material falling onto the return run of the conveyer, and means for pressing the said droppings into the conveyer prior to its passage under the hopper.

9. A device, for pasting plastic material in a foraminous conveyer having a carrying run and a return run disposed in substantially horizontal planes one above the other, said device comprising a hopper disposed above the carrying run, a backing platform disposed below the carrying run and on which the said run rests, an extruding roll rotatably mounted in the hopper at a point adjacent the rear edge of the backing platform for forcing the material out of the hopper into the conveyer and compressing the material in the conveyer, a shear blade spaced rearwardly from the rear edge of the backing platform and engaging the lower surface of the carrying run of the conveyer for shearing extruded material from the said under side of the carrying run of the conveyer, a platform under the return run of the conveyer adapted to receive the sheared material dropped from the shear blade onto the return run of the conveyer, and a roll disposed above the return run of the conveyer and adapted to press the said droppings between its peripheral surface and the said platform into the conveyer passing therebetween prior to the passage of the conveyer under the hopper.

10. A device, for pasting plastic material in a foraminous conveyer having a carrying run and a return run disposed in substantially horizontal planes one above the other, said device comprising a hopper disposed above the carrying run, a backing platform disposed below and carrying run and on which the said run rests, an extruding roll rotatably mounted in the hopper at a point adjacent the rear edge of the backing platform for forcing the material out of the hopper into the conveyer and compressing the material in the conveyer, a shear blade spaced rearwardly from the rear edge of the backing platform and engaging the lower surface of the carrying run of the conveyer for shearing extruded material from the said under side of the carrying run of the conveyer, a platform under the return run of the conveyer adapted to receive the sheared material dropped from the shear blade onto the return run of the conveyer, and a roll disposed above the return run of the conveyer and adapted to press the said droppings between its peripheral surface and the said platform into the conveyer passing therebetween prior to the passage of the conveyer under the hopper, said roll functions as a means for directing the conveyer out of its return run into the carrying run thereof.

11. A device, for pasting plastic material in a foraminous conveyer having a carrying run and a return run disposed in substantially horizontal planes one above the other, said device comprising a hopper disposed above the carrying run, a backing platform disposed below the carrying run and on which the said run rests, an extruding roll rotatably mounted in the hopper at a point adjacent the rear edge of the backing platform for forcing the material out of the hopper into the conveyer and compressing the material in the conveyer, a shear blade spaced rearwardly from the rear edge of the backing platform and engaging the lower surface of the carrying run of the conveyer for shearing extruded material from the said under side of the carrying run of the conveyer, a platform under the return run of the conveyer adapted to receive the sheared material dropped from the shear blade onto the return run of the conveyer, a roll disposed above the return run of the conveyer and adapted to press the said droppings between its peripheral surface and the said platform into the conveyer passing therebetween prior to the passage of the conveyer under the hopper, said roll functions as a means for directing the conveyer out of its return run into the carrying run thereof, and an extension on the platform which underlies the said return run, said extension extending around said directing roll to maintain the droppings in the conveyer.

12. A device, for pasting plastic material in a foraminous conveyer, comprising a hopper disposed adjacent one face of the conveyer, an extruding roll rotatably mounted in the hopper for forcing the material out of the hopper into the conveyer, and a shear blade adjacent the opposite face of the conveyer for shearing extruded material from said opposite face of the conveyer.

13. A device, for pasting plastic material in a foraminous conveyer, comprising a hopper disposed adjacent one face of the conveyer, an extruding roll rotatably mounted in the hopper for forcing the material out of the hopper into the conveyer, a backing board adjacent the opposite face of the conveyer and terminating at a point adjacent the extruding roll, and a shear blade adjacent the opposite face of the conveyer and spaced from the terminus of the backing board for shearing extruding material from the said opposite face of the conveyer.

14. A device, for pasting plastic material in a foraminous conveyer, comprising a hopper disposed adjacent one face of the conveyer, an extruding roll rotatably mounted in the hopper for forcing the material out of the hopper into the conveyer, a backing board adjacent the opposite face of the conveyer and terminating at a point adjacent the extruding roll, a shear blade adjacent the opposite face of the conveyer and spaced from the terminus of the backing board for shearing extruded material from the said opposite face of the conveyer, and means for regulating the position of the extruding roll relative to the conveyer and the backing board for regulating the degree of compression placed upon the material therebetween.

15. A device, for pasting plastic material in a foraminous conveyer, comprising a hopper disposed adjacent one face of the conveyer, an extruding roll rotatably mounted in the hopper for forcing the material out of the hopper into the conveyer, a backing board adjacent the opposite face of the conveyer and terminating at a point adjacent the extruding roll, a shear blade adjacent the opposite face of the conveyer and spaced from the terminus of the backing board for shearing extruded material from the said opposite face of the conveyer, and means for resiliently supporting the extruding roll with respect to the backing board.

16. A device, for pasting plastic material in a foraminous conveyer, comprising a hopper disposed adjacent one face of the conveyer, an extruding roll rotatably mounted in the hopper for forcing the material out of the hopper into the conveyer, a backing board adjacent the opposite face of the conveyer and terminating at a point adjacent the extruding roll, a shear blade adjacent the opposite face of the conveyer and spaced from the terminus of the backing board for shearing extruded material from the said opposite face of the conveyer, means for pivotally supporting the hopper at one of its ends, and means for resiliently supporting the hopper at its opposite end.

17. A device, for pasting plastic material in a foraminous conveyer, comprising a hopper disposed adjacent one face of the conveyer, an extruding roll rotatably mounted in the hopper for forcing the material out of the hopper into the conveyer, a backing board adjacent the opposite face of the conveyer and terminating at a point adjacent the extruding roll, a shear blade adjacent the opposite face of the conveyer and spaced from the terminus of the backing board for shearing extruded material from the said opposite face of the conveyer, means for pivotally supporting the hopper at one of its ends, means for supporting the opposite end of the hopper in predetermined position relative to the backing board, and means for resiliently maintaining the last said end of the hopper in said predetermined position.

18. A device, for pasting plastic material in a foraminous conveyer, comprising a hopper disposed adjacent one face of the conveyer, an extruding roll rotatably mounted in the hopper for forcing the material out of the hopper into the conveyer, a backing board adjacent the opposite face of the conveyer and terminating at a point adjacent the extruding roll, a shear blade adjacent the opposite face of the conveyer and spaced from the terminus of the backing board for shearing extruded material from the said opposite face of the conveyer, means for pivotally supporting the hopper at one of its ends, means for supporting the opposite end of the hopper in predetermined position relative to the backing board, means for resiliently maintaining the last said end of the hopper in said predetermined position, and means for regulating the degree of resiliency of the said maintaining means.

ALPHEUS O. HURXTHAL.